Patented July 13, 1926.

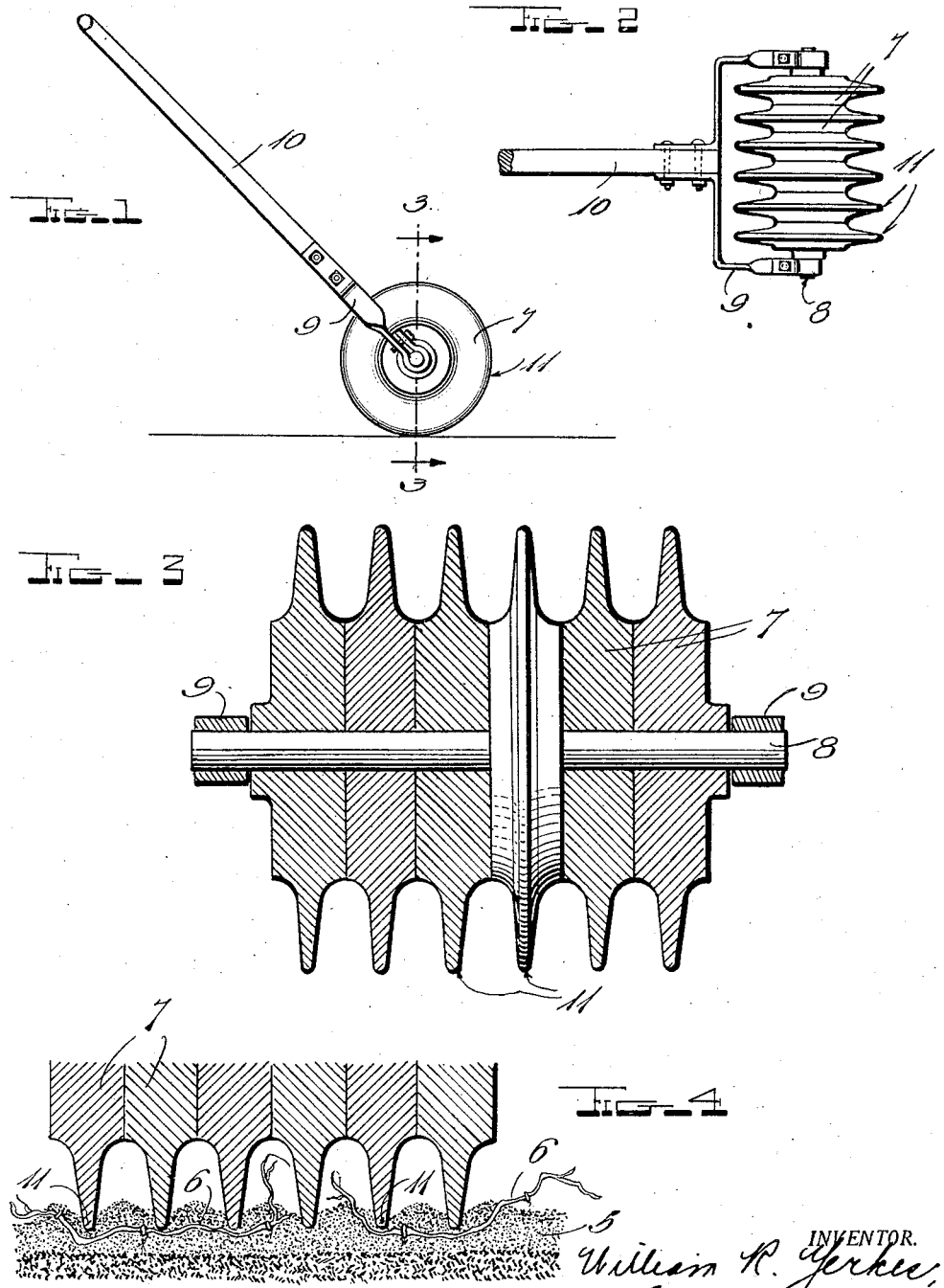

1,592,250

UNITED STATES PATENT OFFICE.

WILLIAM R. YERKES, OF HUTCHINSON, KANSAS.

METHOD OF PLANTING GRASS RUNNERS.

Application filed December 29, 1924. Serial No. 758,626.

This invention relates to methods of and means for seeding or planting grass roots or the like, and the said invention has been employed with success in connection with the deposit of "creeping bent" and other creeping grasses, which, as is well known, is deposited in loose earth. Under ordinary methods of planting, the "seed" or grass runners are distributed over the prepared soil and top dressings are then applied which are usually rolled or slightly compressed, whereas by the method and device of this invention, the grass runners are distributed on the prepared soil and pressure is applied to certain parts of the grass runners to partially imbed them in the soil.

As a device has been passed over the prepared bed containing the grass runners, certain parts of the grass runners are forced into the prepared soil, while parts of the grass runners are exposed at the surface of the bed so that a quick start of the growth will result. The pressure imparted to parts of the grass runners will serve to anchor them in the bed and some of the soil will fall over the runners so that they will be covered or partially covered by the said soil.

In planting creeping grasses by the method and device of this invention, the soil or ground is left in a loose state on top and crusting or hardening of the surface of the soil does not occur to the extent that it does when the soil is rolled.

The invention furthermore consists in a device which will exert pressure on parts of the grass runners after they have been distributed on the prepared soil, the said device being effective to force those parts of the grass runners which they engage rather deeply in the soil so that the grass runners will be anchored and partially covered, as heretofore explained.

With the foregoing and other objects in view, the invention consists in the details of construction, and in the arrangement and combination of parts to be hereinafter more fully set forth and claimed.

In describing the invention in detail, reference will be had to the accompanying drawings forming part of this application wherein like characters denote corresponding parts in the several views, and in which—

Figure 1 illustrates a view in elevation of a grass runner pressing device embodying the invention;

Figure 2 illustrates a plan view thereof:

Figure 3 illustrates an enlarged sectional view;

Figure 4 illustrates a detail view illustrating the action of the device in practice.

In carrying the invention into practice, the bed or soil 5 may be prepared in the usual manner and the grass runners 6 may be distributed on the surface thereof as thick as practice dictates. When these steps of the process have been completed, portions of the grass runners are wholly imbedded in the prepared soil, while parts of the runners remain on the surface of the soil. Provision may be made for pressing the soil by closely arranged devices or the pressing devices may be separated to a greater or less extent, according to the conditions.

A device for pressing the grass runners into the soil may consist of a plurality of disks 7 mounted on an axle 8, which axle may be applied to a yoke 9 having a handle 10, by which the device may be drawn over the soil to be cultivated. Each of the disks has a periphery 11 which is blunt enough to prevent cutting of the grass runners; that are to force the grass runners into the soil to be planted, and, if desired, the runner pressing device may be passed over the same portions of the bed in two or more directions, or in the same direction but in slightly different tracks, but these are details in operation which may be changed to suit particular requirements, the condition of the soil, etc.

I claim:

The method of planting grass runners consisting in preparing the soil to loosen the same, distributing the grass runners evenly over the soil and rolling the soil with a roller having equispaced groove-forming blunt ridges, whereby pressure is applied to alternate portions of the grass runners to imbed them in the soil leaving the intermediate portions exposed upon the surface of the soil.

WILLIAM R. YERKES.